(12) United States Patent
Dveyrin

(10) Patent No.: US 6,568,477 B1
(45) Date of Patent: May 27, 2003

(54) METHOD AND APPARATUS FOR CONVEYING FLUIDS, PARTICULARLY USEFUL WITH RESPECT TO OIL WELLS

(75) Inventor: Dmitry Dveyrin, Haifa (IL)

(73) Assignee: Goal-Gas & Oil Associates Ltd., Kfar Vradim (IL)

( * ) Notice: Subject to any disclaimer, the term of this patent is extended or adjusted under 35 U.S.C. 154(b) by 0 days.

(21) Appl. No.: 09/744,199

(22) PCT Filed: Jul. 19, 1999

(86) PCT No.: PCT/IL99/00397

§ 371 (c)(1),
(2), (4) Date: Jan. 22, 2001

(87) PCT Pub. No.: WO00/05485

PCT Pub. Date: Feb. 3, 2000

Related U.S. Application Data

(60) Provisional application No. 60/093,586, filed on Jul. 21, 1998, provisional application No. 60/100,115, filed on Sep. 14, 1998, and provisional application No. 60/125,936, filed on Mar. 23, 1999.

(51) Int. Cl.[7] ............................................. E21B 43/18
(52) U.S. Cl. ........................ 166/370; 166/68; 166/105
(58) Field of Search ................... 166/370, 105, 166/68, 369, 242.1

(56) References Cited

U.S. PATENT DOCUMENTS

| | | | |
|---|---|---|---|
| 2,394,189 A | 2/1946 | Kaufman | |
| 4,768,595 A | 9/1988 | Smith | |
| 4,836,287 A | * 6/1989 | Couste et al. | ................ 166/321 |
| 5,105,889 A | 4/1992 | Misikov et al. | |
| 5,562,161 A | 10/1996 | Hisaw et al. | |
| 5,806,599 A | 9/1998 | Hisaw et al. | |
| 5,893,414 A | 4/1999 | Shaposhnikov et al. | |
| 5,941,311 A | * 8/1999 | Newton | ...................... 166/369 |

* cited by examiner

*Primary Examiner*—David Bagnell
*Assistant Examiner*—Zakiya Walker
(74) *Attorney, Agent, or Firm*—Eitan, Pearl, Latzer & Cohen Zedek, LLP.

(57) ABSTRACT

A method and apparatus for conveying a fluid flowing through a flow passageway (16) in a tubing (7), by; introducing into the flow passageway (16) flow zones of small cross-sectional area (11) alternating with flow zones of large cross-sectional area (12) to produce high-velocity, low-pressure zones alternating with low-velocity, high-pressure zones; and providing abrupt transitions from the small cross-sectional area zones (11) to the large cross-sectional area zones (12) to produce a turbulent flow generating swirls and eddies (19) at such transitions. The method and apparatus are particulary useful in oil well applications where the fluid is an oil-gas mixture, but could be used in other applications where the fluid is a liquid-sand mixture, a gas-liquid mist, or a viscous liquid.

5 Claims, 9 Drawing Sheets

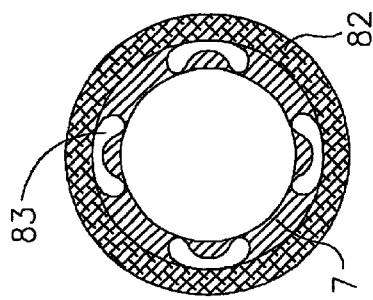
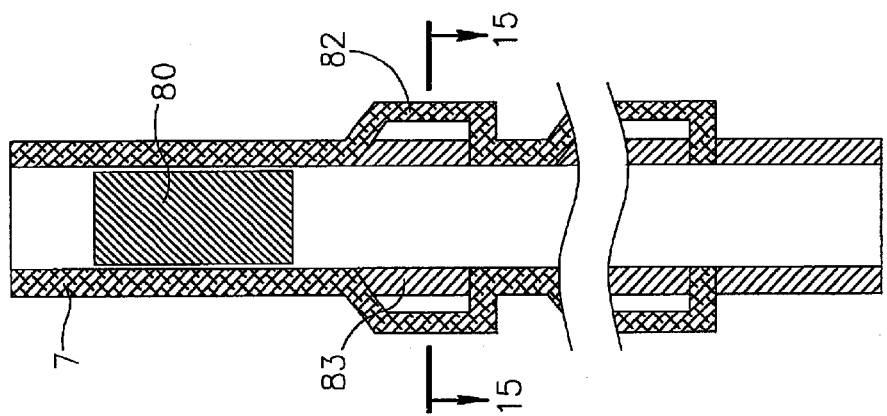
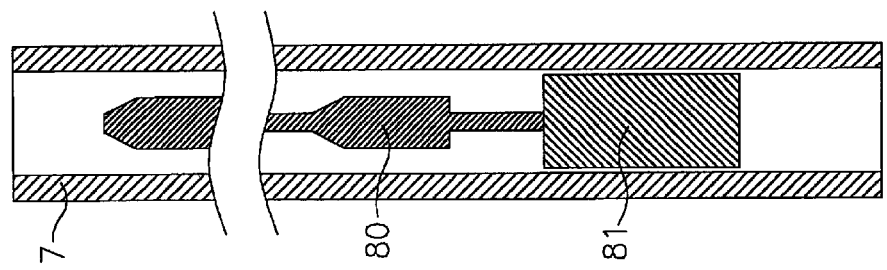
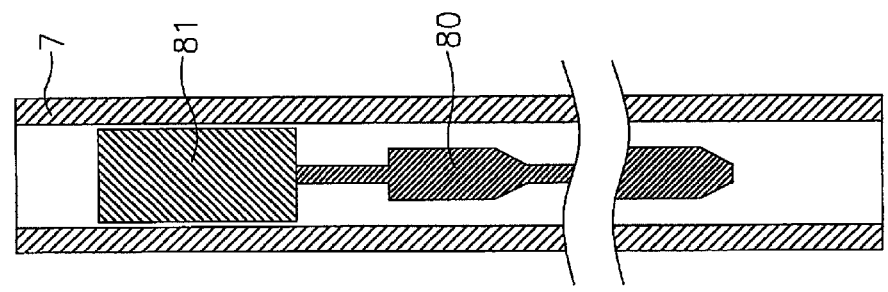

METHOD AND APPARATUS FOR CONVEYING FLUIDS, PARTICULARLY USEFUL WITH RESPECT TO OIL WELLS

This application claims the benefit of U.S. Provisional Applications: No. 60/093,586, filed Jul. 21, 1998; No. 60/100,115, filed Sep. 14, 1998; and No. 60/125,936, filed Mar. 23, 1999.

FIELD AND BACKGROUND OF THE INVENTION

The present invention relates to a method and apparatus for conveying fluids. The invention is particularly useful in conveying liquid-gas mixtures and is therefore described below with respect to these applications, but it will be appreciated that the invention could advantageously be used in many other applications, such as in conveying liquid-sand mixtures, gas-liquid mixtures, viscous liquids, and immiscible-liquid mixtures. Also, while the invention is particularly useful in oil production wells, it can also be used in gas and condensate production wells, liquid transporting systems, wells drilling systems, etc.

Free-flowing oil wells utilize the natural energy of the underground reservoir, including the reservoir pressure and the energy of gas dissolved in the oil, for lifting the oil from the underground reservoir to the surface. However, this natural pressure is continuously depleted during the operation of the oil well, so that an artificial lift is required if the oil well is to continue to produce. Artificial lift may be provided by one of many known pumping methods, such as by using the rod pump or centrifugal submerged pump, by injecting gas into the well, or by including different kinds of gas-lift and plunger-lift methods, as described for example in the U.S. Pat. Nos. 5,105,889 and 5,562,161.

OBJECT AND BRIEF SUMMARY OF THE INVENTION

An important object of the present invention is to enhance the delivery of oil through an oil well in order to increase the production and/or reduce the production cost of the oil well, and/or to delay the point where an artificial lift becomes necessary.

While the invention is particularly useful in oil wells, the invention may also be advantageously used in many other applications involving the conveying of a fluid, especially a liquid-gas mixture such as oil flowing through a horizontal pipeline. Accordingly, another object of the invention is to provide a method and apparatus for conveying a fluid flowing through a tubing According to a broad aspect of the present invention, there is provided a method of conveying a fluid flowing through a flow passageway in a tubing, comprising: introducing into the flow passageway zones of small cross-sectional area alternating with zones of large cross-sectional area to produce high-velocity, low-pressure zones alternating with low-velocity, high-pressure zones; and providing abrupt transitions from the small cross-sectional area zones to the large cross-sectional area zones to produce a turbulent flow generating swirls and eddies at such transitions.

The invention is particularly useful for conveying liquid-gas mixtures, in which case the turbulent flow produced at the abrupt transitions is effective to intensively mix the liquid and gas, and thereby to produce small and uniformly-distributed gas bubbles such as to decrease the density of the flowing liquid-gas mixture and to enhance its flow through the passageway.

Thus, as the liquid-gas mixture flows through the small area zones, the flow velocity increases and the pressure decreases according to Bernoulli's Law. Where the pressure at the entrance to the small area zone is higher than the bubble-point pressure inside the small area zone, the pressure becomes lower than the bubble-point pressure. This causes early (compared to regular well construction) gas liberation from the oil, and therefore early utilization of its energy. On the other hand, if the pressure at the entrance to the small area zone is lower than the bubble-point pressure, a heterogeneous liquid-gas mixture enters the small area zone, increases its velocity, and reduces the pressure. As a result, any remaining dissolved gas is liberated from the oil, adding its energy to the flow. In addition, the higher velocity provides the primary destruction of the large gas bubbles; it also stabilizes the finely dispersed gas-liquid structure and prevents the coagulation of fine gas particles into larger ones.

On the other hand, during the flow in the large area zones, the velocity decreases and the pressure increases. By providing abrupt transitions from the small area zones to the large area zones, turbulence is created generating swirls and eddies which convert the large heterogeneously-distributed bubbles into small homogeneously-distributed bubbles. In addition, the high velocity jet flow of the mixture in this transition zone also contributes to the destruction of the large bubbles and to the generation of the finely dispersed oil-gas mixture in the turbulent flow. The result, particularly after a series of such alternating transitions, is to reduce the overall density of the liquid-gas mixture as it flows through the passageway.

According to some described embodiments, gradual transitions are provided from the large cross-sectional area zones to the small cross-sectional area zones to reduce the pressure loss produced in the flow passageway.

As further indicated above, the invention is particularly useful in oil wells, in which case the flow passageway is in upwardly-extending tubing of the oil well. In such cases, the flow is enhanced not only by the lower density produced by the presence of uniformly distributed small gas bubbles, but also by the increased bubble-pressure produced by such small uniformly-distributed gas bubbles. However, the invention could also be advantageously used in other applications, such as in oil and gas wells which include horizontal sections, or which include coiled tubing, as well as in oil pipelines wherein the flow passageway is in horizontally-extending tubing.

As will also be described below, the invention could also be used in applications wherein the fluid is a liquid-sand mixture, the high velocity flow produced in the small cross-sectional area zones being effective to carry out the sand with the liquid flow, and the turbulent flow produced at the abrupt transitions being effective to intensively mix sand particles within the liquid, and thereby to enhance the flow through the tubing.

Another application is one wherein the fluid is a gas-liquid mixture comprising liquid droplets within a flowing gas, the high velocity flow produced in the small cross-sectional area zones being effective to carry out the liquid with the gas flow, and the turbulent flow at the abrupt transitions being effective to reduce the size of the liquid droplets and to uniformly distribute them within the gas flow.

The invention could also be applied wherein the fluid is a viscous liquid, the high velocity flow produced in the small cross-sectional area zones being effective to produce high shear stresses in the liquid, the turbulent flow in the abrupt transitions being effective to destroy the internal structure of the liquid, the pressure fluctuations produced in the liquid flowing through the alternating small cross-sectional area zones and large cross-sectional area zones being effective to produce viscosity reductions and liquid restructuring which further improve the hydrodynamic characteristics of the liquid.

According to further features in some preferred embodiments of the invention described below, the alternating zones of small and large cross-sectional areas are introduced into the flow passageway by inserting retrievable inserts within the tubing, which inserts have outer surfaces shaped to define the small and large cross-sectional area zones with the inner surface of the tubing. In other described embodiments, the alternating zones are introduced into the flow passageway by providing the tubing with tubing sections having inner surfaces shaped to define the small and large cross-sectional area zones.

According to another aspect of the present invention, there is provided an oil well operating in accordance with the above method for delivering oil from an underground reservoir to the surface.

Further features and advantages of the invention will be apparent from the description below.

BRIEF DESCRIPTION OF THE DRAWINGS

The invention is herein described, by way of example only, with reference to the accompanying drawings, wherein:

FIGS. 12, 13 and 14 illustrate the invention implemented in an oil well provided with a plunger-lift;

FIG. 15 is a sectional view along lines 15—15 of FIG. 14; and

DESCRIPTION OF PREFERRED EMBODIMENTS

Figure 1:
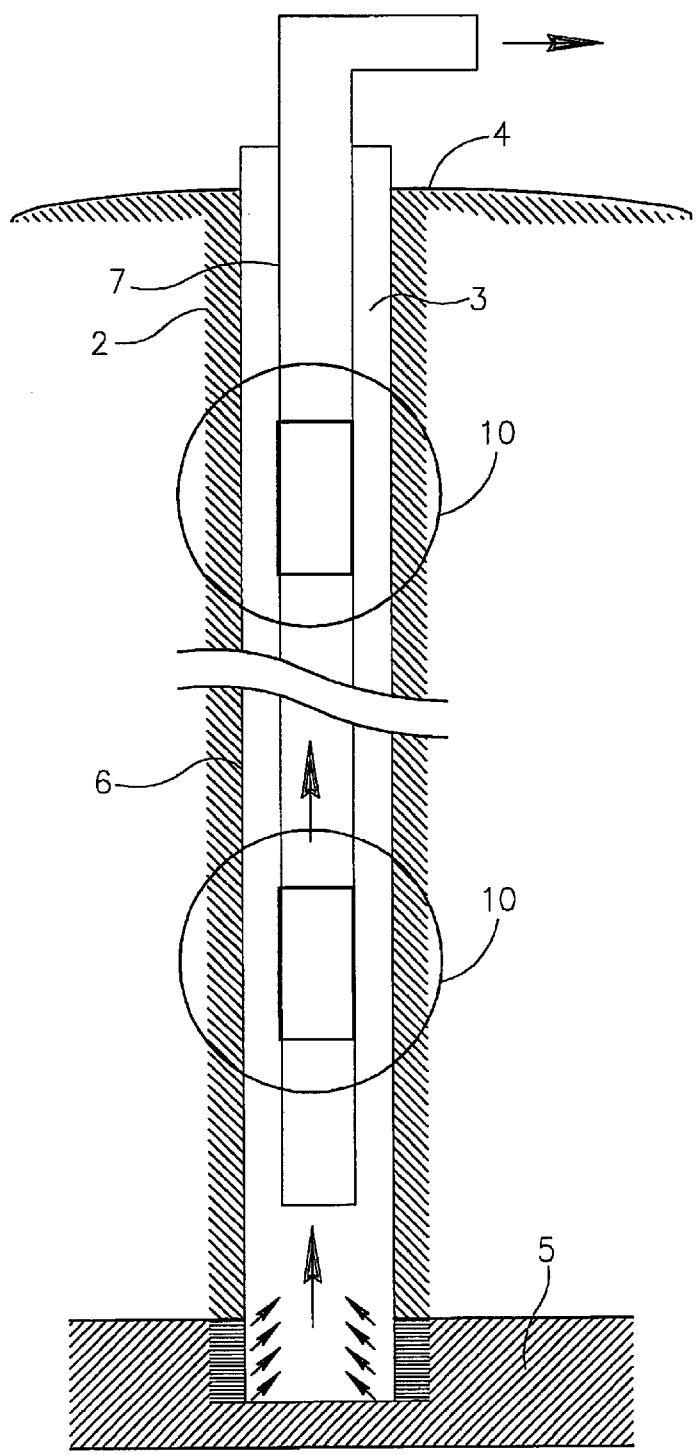
FIG. 1 diagrammatically illustrates an oil well constructed in accordance with the present invention.

With reference first to FIG. 1, there is illustrated an oil well, generally designated 2, defined by a borehole 3 drilled through the earth from the surface 4 to an oil layer or reservoir 5 under the ground; a casing 6 sealing off the borehole; and 2 tubing 7 defining the flow passageway for the oil flowing from the reservoir 5 to the surface 4.

As known, such oil reservoirs 5 generally contain three fluids: oil, gas and salt water. Gas dissolved in the oil separates from the oil in the form of bubbles as the pressure is reduced below the bubble-point pressure. This process does not necessarily occur in the tubing, but may also take place in the reservoir itself, especially in the case of old reservoirs where the natural pressure is depleted. In such case, the oil-gas mixture enters the bottom-hole part of the well.

According to the present invention, the tubing 7 is provided with flow passageway zones of small cross-sectional areas alternating with zones of large cross-sectional area to produce high-velocity, low-pressure zones alternating with low-velocity, high pressure zones. In addition, abrupt transitions are provided from the small cross-sectional area zones to the large cross-sectional area zones to produce a turbulent flow generating swirls and eddies at such transitions effective to produce small and uniform gas bubbles, decreasing the density of the flowing liquid-gas mixture and enhancing its flow through the tubing.

Figure 2:
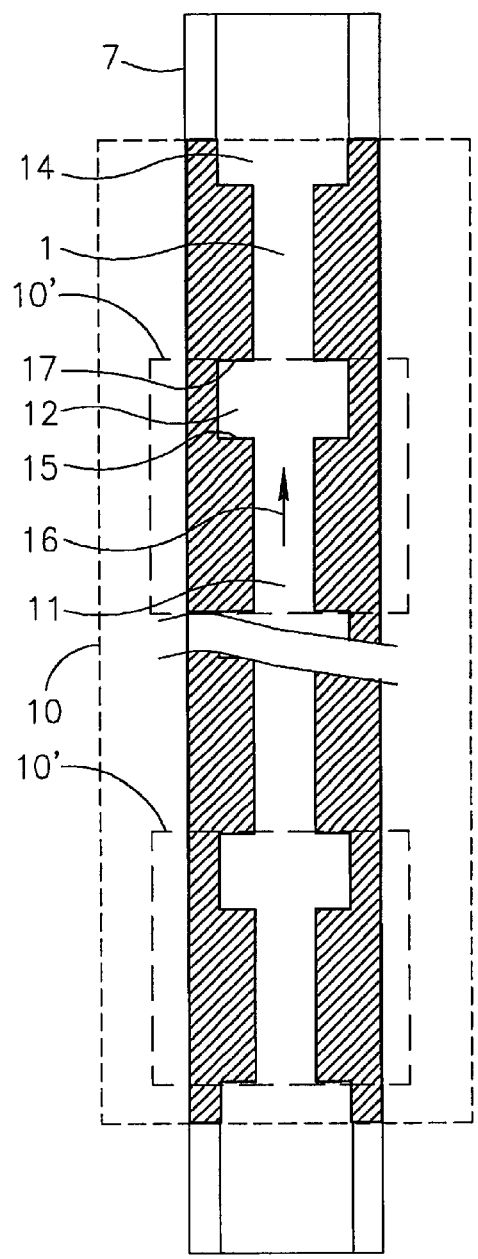
FIG. 2 illustrates one manner of implementing the invention in the oil well of FIG. 1, by providing tubing sections defining the small and large cross-sectional area zones.
Figure 3:
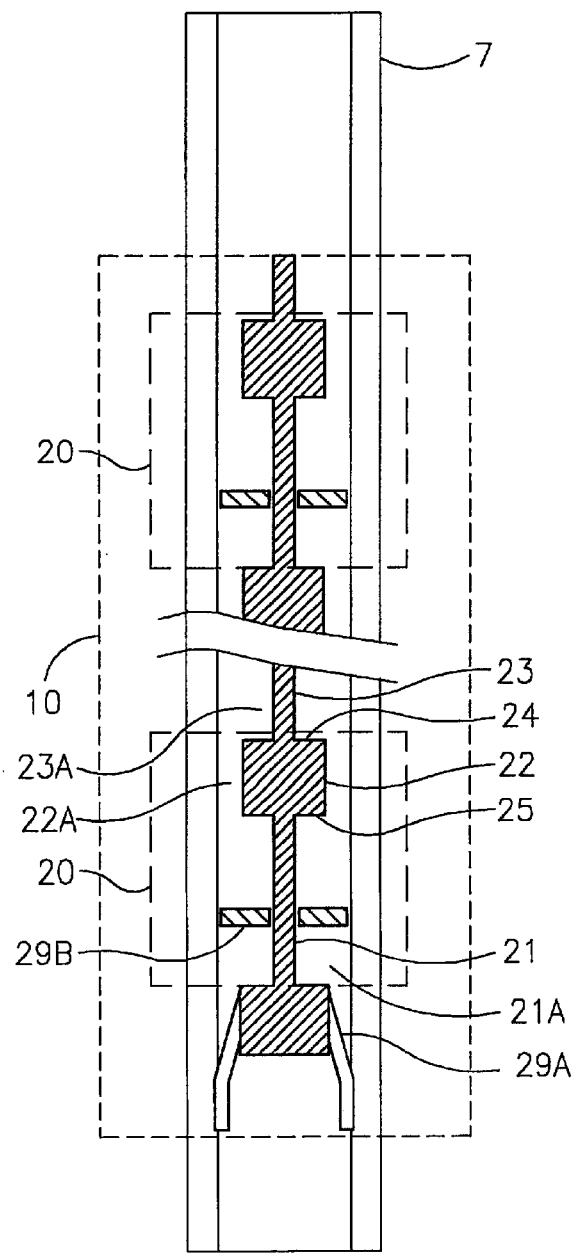
FIG. 3 illustrates another manner of implementing the invention in the oil well of FIG. 1, by providing retrievable inserts defining the small and large cross-sectional area zones.

FIGS. 2 and 3 illustrate different manners of producing the small area zones alternating with the large area zones, namely by providing tubing 7 with sections 10 comprised of one or more of elements 10' (FIG 2) wherein inner surfaces are shaped to define the small and large cross-sectional area zones, or comprised of one or more of elements 20 (FIG. 3) wherein the small area and large area alternating zones are produced by retrievable inserts.

Thus, as shown more particularly in FIG. 2, the element 10' of sections 10 of tubing 7, defining these alternating small and large area zones, are of alternating thickness in cross-section, such as to define a small area zone 11, a large area zone 12, a small area zone 13, and a large area zone 14. It will also be seen from FIG. 2 that all the transitions from one zone to the other are abrupt transitions, rather then gradual transitions. Thus, the transition between the small area zone 11 and large area zone 12 is defined by a surface 15 which is perpendicular (or nearly perpendicular) to the flow path 16 of the oil-gas mixture. The transition from the large area zone 12 to the small area zone 13 is similarly defined by a surface 17 perpendicular (or nearly perpendicular) to the flow path, but this is shown only for schematic purposes, as in most cases this transition would be gradual, not abrupt, in order to minimize the pressure loss.

Figure 4A:
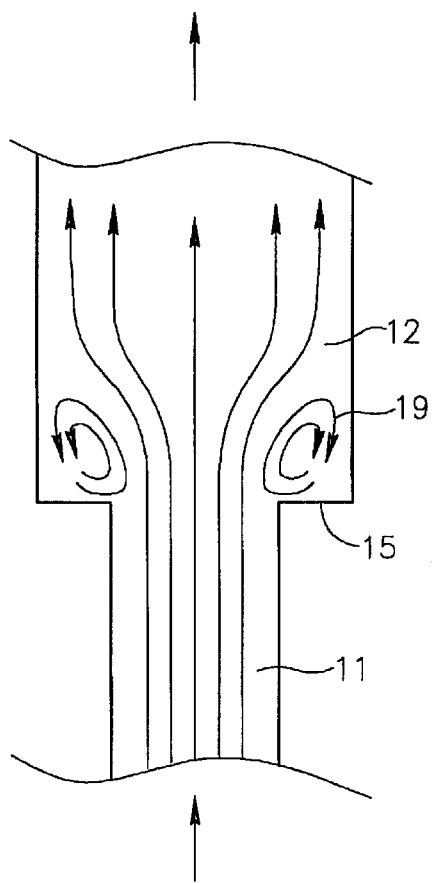
FIGS. 4a and 4b diagrammatically illustrate the transition from a small area to a large area zone in the tubing-section implementation of FIG. 2.
Figure 4B:
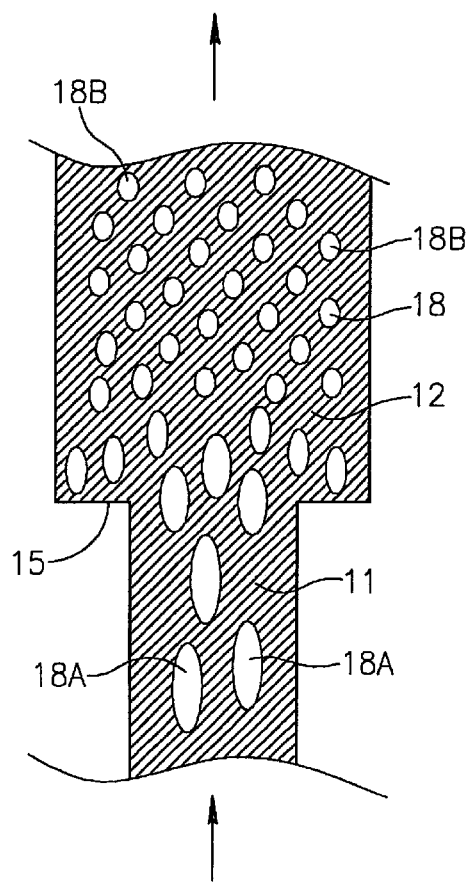

FIGS. 4a and 4b more particularly illustrate what occurs in the small area zone 11, in the large area zone 12, and in the transition 15 between the two zones.

Thus, the small area zone 11 produces a high velocity flow of the oil-gas mixture, and consequently a low pressure. As a result, there is an early gas liberation from the oil and an early utilization of its energy. Thus, large bubbles 18a tend to form heterogeneously in the mixture flowing through this zone. Since the transition 15 from the small area zone 11 to the large area zone 12 is abrupt (rather than gradual), this tends to produce a turbulent flow at this transition, generating swirls and eddies as shown at 19. These swirls and eddies destroy the large gas bubbles and intensively mix the gas and oil, converting the large heterogeneous bubbles 18a in the small area zone 11 to small, uniform and homogeneously-distributed bubbles 18b in the large area zone 12. In addition, the low velocity flow of the oil-gas mixture in the large area zone 12 is accompanied by higher pressure, which thereby tends to stabilize the small homogeneous bubbles 18b within the flow.

The overall effect, particularly after the oil-gas mixture traverses a number of these alternating zones, is to produce a stable liquid-gas flow regime having a lower density. The lower density of the mixture is caused by the same volume of gas, but distributed uniformly, so that each unit volume of the mixture contains more or less the same amount of finely dispersed gas bubbles. The smaller gas bubbles have higher external surface areas than the large bubbles even though containing the same volume of gas, and therefore produce a large bubble pressure enhancing the flow through the tubing.

FIG. 3 illustrates a variation wherein the small area and large area alternating zones are produced by retrievable inserts inserted within tubing 7. In this implementation, the small and large area zones are defined by the space between the shaped outer surfaces of the inserts and the inner surface of the tubing 7.

FIG. 3 illustrates an element 20 of sections 10 of tubing 7 with the inserts defining the small and large area zones. Thus, as shown in FIG. 3, the inserts include a small-diameter section 21 defining a large area flow zone 21a between it and the inner surface of tubing 7; a large-diameter section 22 defining a small area flow zone 22a; and a small-diameter section 23 defining a large area flow zone 23a. The transitions 24, 25, between the different flow zones are abrupt, as in the case of the construction illustrated in FIG. 2.

Figure 5A:
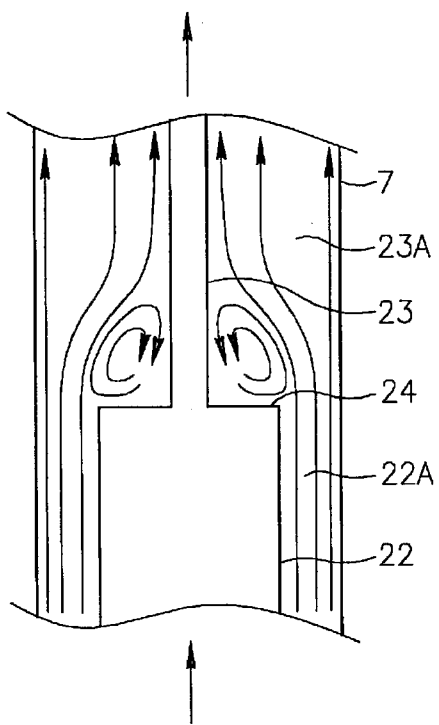
FIGS. 5a and 5b illustrate similar transitions in the retrievable-inserts implementation of FIG. 3.
Figure 5B:
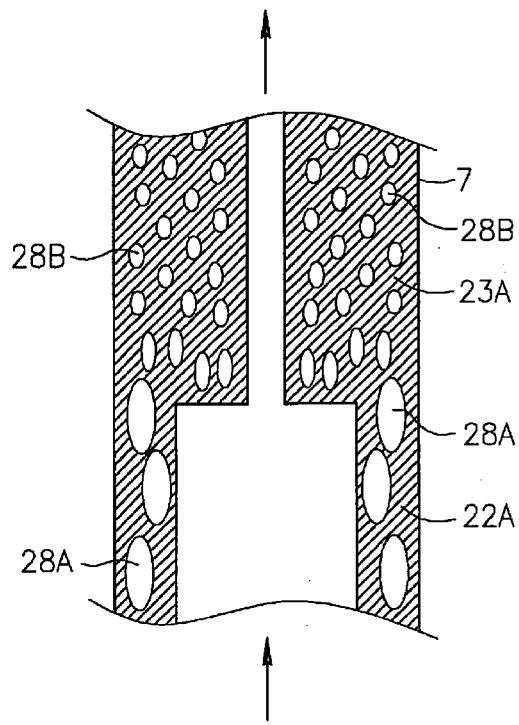

Accordingly, a similar action will occur with respect to the bubbles formed in the oil-gas mixture. This is more particularly illustrated in FIGS. 5a to and 5b illustrating only the large-diameter section 22, the adjacent small-diameter section 23, and the transition 24 between the two sections. Thus, as described above, and as more particularly shown in FIG. 5b, the flow in the small area zone 22a produces large heterogeneous bubbles 28a; the abrupt transition 24 between the two zones produces swirls and eddies intensively mixing the gas within the liquid, breaking up the large bubbles 28a, and generating instead small uniform bubbles 28b, and the low velocity flow in zone 23a, accompanied by the higher pressure, stabilizes and uniformly distributes the bubbles, to thereby decrease the density of the flowing oil-gas mixture and enhance its flow through the tubing 7.

FIG. 3 further illustrates an anchoring device 29a for anchoring the string of inserts within tubing 7; and a centering device 29b engageable with the small-diameter section 21 for centering the string of inserts within the tubing.

Figure 6:
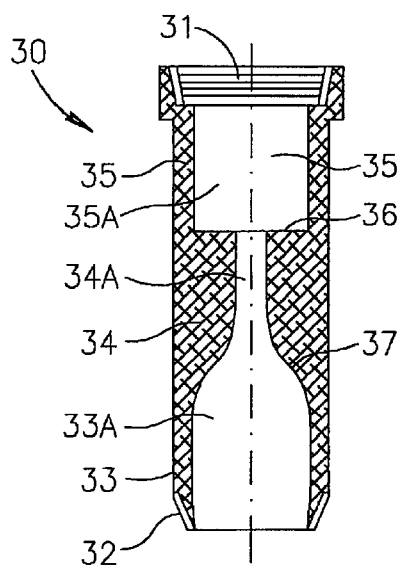
FIG. 6 illustrates a one-piece tubing section construction that may be used in the tubing-section implementation of FIG. 2.
Figure 7A:
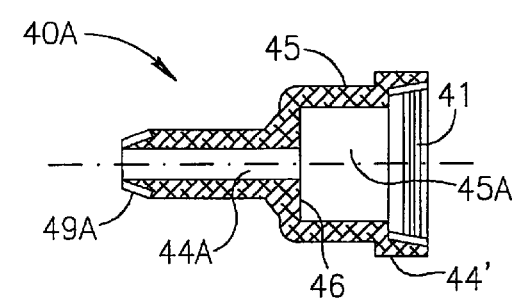
FIGS. 7a and 7b, together, illustrate a two-piece tubing section construction that may be used in the FIG. 2 implementation.
Figure 7B:
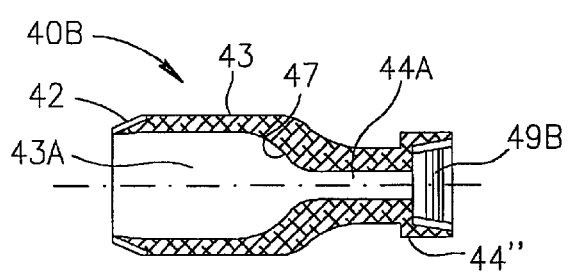

FIGS. 6, 7a and 7b illustrate examples of constructions that may be used for the embodiment of FIG. 2 wherein the tubing sections are made to define the small and large area flow zones. Thus, as shown in FIG. 6, the tubing section 30 illustrated therein is formed with internal thread 31 at one end to serve as a socket, and external thread 32 at the opposite end to serve as a plug for threading into socket 31 of another like tubing section 30. Tubing section 30 is formed with a thin wall portion 33 defining a large area zone 33a in the flow passageway, a thick wall section 34 defining a small area zone 34a, and a thin wall section 35 defining a large area zone 35a. As in the above-described embodiment, the transition 36 between the small area zone 34a and the large area zone 35a is abrupt, to produce the swirls and eddies described above with respect to FIGS. 4a and 4b. In this case, however, the transition between the large area flow zone 33a and the small area flow zone 34a is not abrupt, but rather is gradual, as shown at 37. Such a construction would be used in order to reduce the pressure loss produced in the flow passageway where that may be desired according to the particular application.

FIGS. 7a and 7b, taken together, illustrate a tubing section similar to that of FIG. 6, but constructed of two parts 40a, 40b, which may be joined together to serve as an equivalent of the single part 30 in FIG. 6. Thus, part 40a shown in FIG. 7a includes an internal thread 41 at one end serving as the socket; and part 40b shown in FIG. 7b is formed with the external thread 42 at the opposite end serving as the plug for threading into socket 41 of part 40a, corresponding to socket 31 and plug 32 in FIG. 6.

Part 40b (FIG. 7b) further includes a thin wall portion 43 defining a large area flow zone 43a; and part 40a illustrated in FIG. 7a includes a thin wall portion 45 defining a large area flow zone 45a. The intermediate small area flow zone, corresponding to 34 in FIG. 6, is defined by two mating sections, 44' of part 40a, and 44" of part 40b, which mating sections are formed with external thread 49a and internal thread 49b, respectively, for attachment to each other to define the small area zone 44a.

The two-piece construction illustrated in FIG. 7a and FIG. 7b also includes the abrupt transition 46 between the small area flow zone 44a and the large area flow zone 45a, and the gradual transition 47 between the large area flow zone 43a and the small area flow zone 44a.

Figure 8:
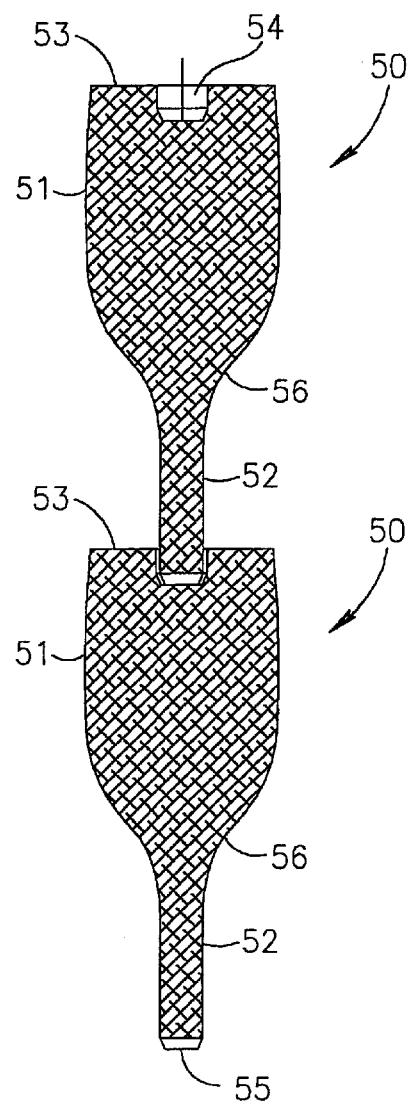
FIG. 8 illustrates the construction of a retrievable insert which may be used in the FIG. 3 implementation.

FIG. 8 illustrates a construction that may be used for each of the retrievable inserts in the FIG. 3 embodiment wherein the outer surfaces of the insert are shaped to cooperate with the inner surface of the tubing 7 to define the small and large area flow zones.

FIG. 8 illustrates two such inserts, each also of a one-piece modular construction, generally designated 50, including a large-diameter portion 51 at one end, and a small diameter portion 52 at the opposite end. The large diameter portion 51 includes a right-angle end wall 53 formed at its center with internal threads 54 serving as a socket for receiving another like insert; and the small diameter portion 52 is formed with external thread 55 serving as a plug for threading into socket 54 of another like insert. In the illustrated construction, the two portions 51, 52 are joined together by a gradual transition 56.

It will thus be seen that when a plurality of inserts 50 are assembled together within a tube 7, by threading plug 55 of one insert into socket 54 of the adjacent insert, the large-diameter portion 51 defines a small area flow zone with the tube 7, and the small-diameter portion 52 of the adjacent insert defines a large area flow zone within the tube. In addition, the end wall 53 of one insert, cooperating with the small diameter portion 52 of the adjacent insert, defines an abrupt transition between the small area flow zone and the large area flow zone; whereas the curved juncture 56 between the two portions 51 and 52 of each insert 50 defines a gradual transition between the large area flow zone and the small area flow zone.

Figure 9:
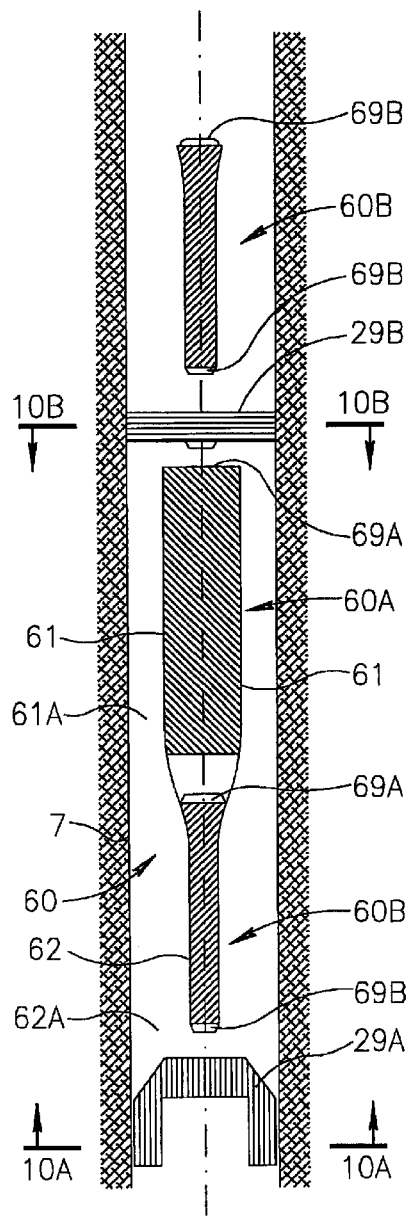
FIG 9 illustrates a string of retrievable inserts that may be used in the FIG. 3 implementation.

FIG. 9 illustrates a similar construction as FIG. 8, except that the inserts 60 are in two parts, 60a, 60b, which when joined together, define the equivalent of the one-part insert 50 in FIG. 8. Thus, part 60a includes the large-diameter portion 61 defining the small area flow zone 61a, and part 60b includes the small diameter portion 62 defining the large area flow zones 62a. The two parts may be attached together in any suitable manner, as by internal threads 69a in the opposite ends of part 60a receiving external threads 69b in the opposite ends of part 60b.

Figure 10A:
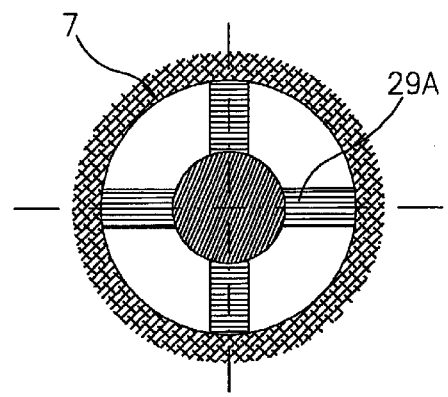
FIGS. 10a and 10b are sectional views along line 10a—10a and 10b—10b respectively of FIG. 9.
Figure 10B:
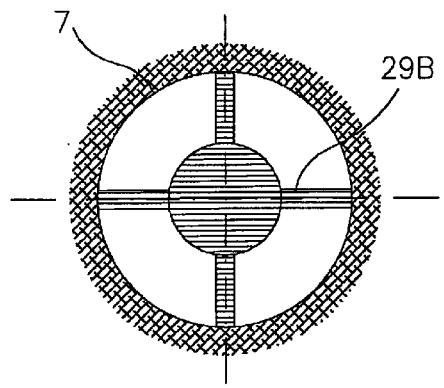

FIG. 9 also schematically illustrates the anchoring device 29a, at the bottom of the string of inserts, and the centering device 29b at an intermediate location within the string of inserts, corresponding to element 29a and 29b in FIG. 3 The anchoring device 29a and centering device 29b are of a spider construction to permit flow therethrough, as shown in FIGS. 10a and 10b.

As mentioned earlier, the alternating flow path construction described above could be included in a free flowing well or in a well having an artificial lift. The latter is illustrated schematically in FIG. 11, wherein the alternating area zones are produced by a string of inserts, generally designated 70 corresponding to the construction illustrated in FIG. 9 and having outer surfaces shaped to define the alternating flow zones with inner surface of the tubing 7. The pump illustrated in FIG. 11 is of the rod type, including a reciprocating sucker rod 71.

For pumping well applications, it is preferable to include two devices, one below the pump at the lower pressure side, and one above the pump at the high pressure side.

Figure 11:
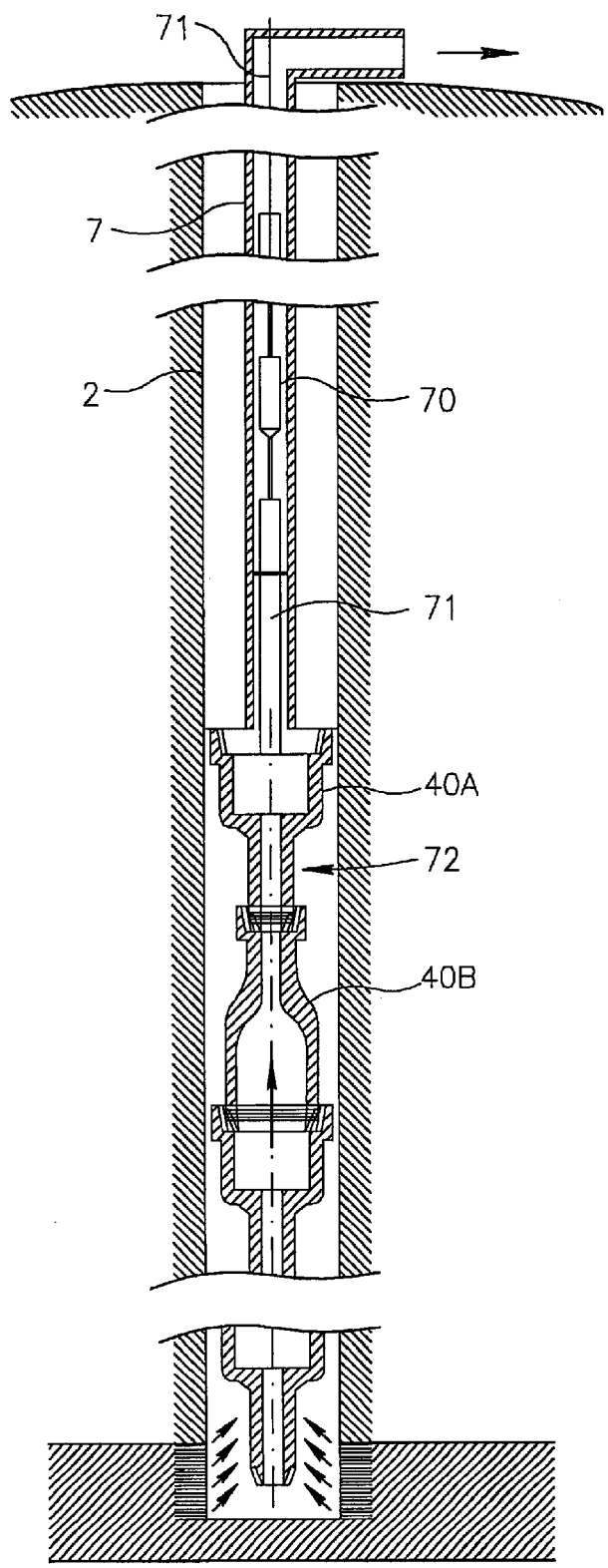
FIG. 11 illustrates the invention implemented in an oil well provided with a rod pump.
Figure 16:
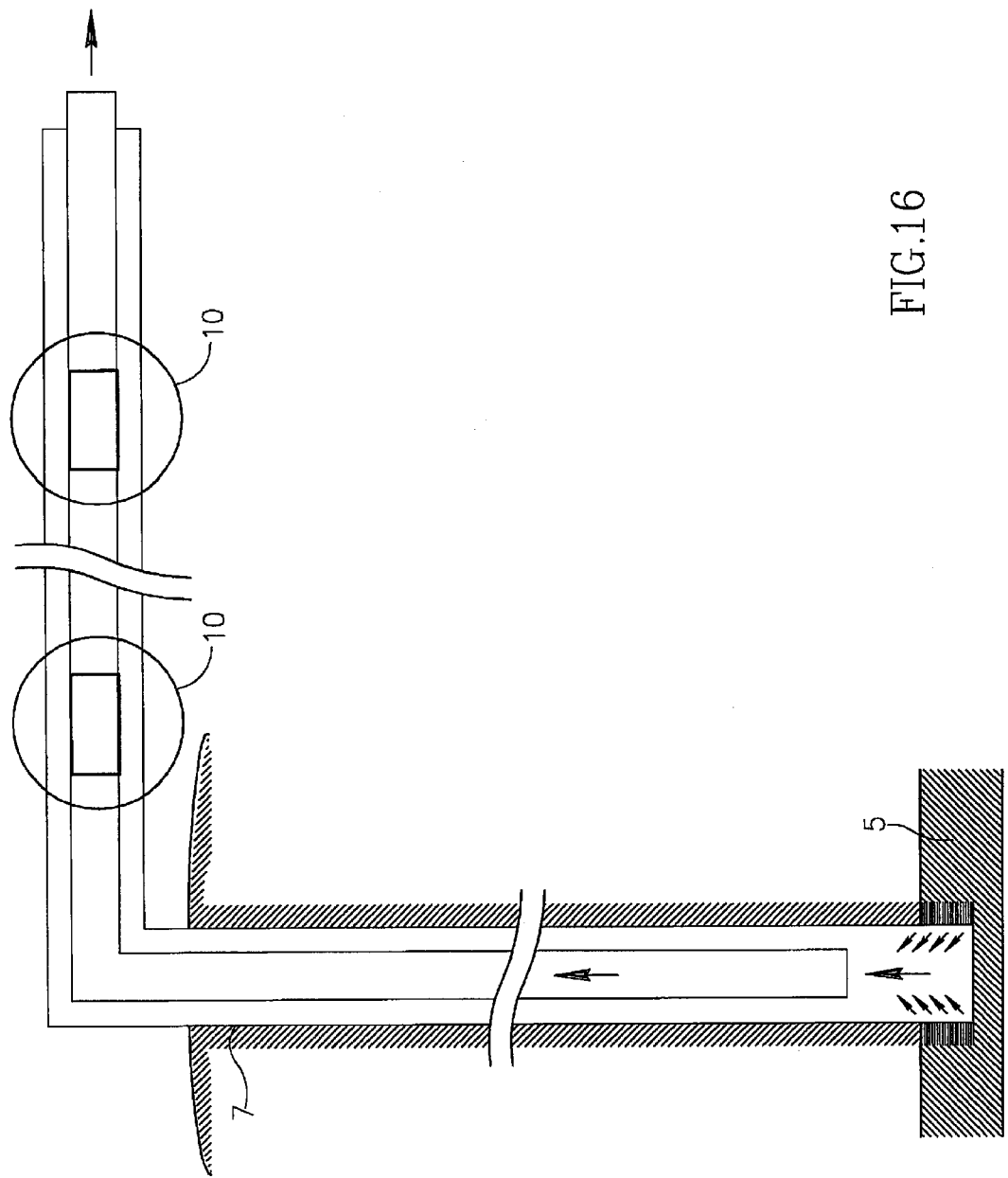
FIG. 16 diagrammatically illustrates an oil well with a passageway in a horizontally-extending tubing constructed in accordance with the present invention.

FIG. 11 illustrates the device at the high pressure side of the pump in the form of a string of inserts 70 above the sucker rod 71, and the device at the low pressure side of the pump in the form of a string 72 of alternating tube sections, corresponding to tube sections 40a, 40b in FIGS. 7a, 7b.

In order to obtain higher pressure at the pump inlet (low pressure side of the pump), the large cross-section area of the insert device should be larger than that of the entire tubing of the pump itself. The small cross-section area should be of the same order of magnitude, or preferably less than that of the entire tubing to produce higher velocity.

In the case where the pressure in the high area part is higher than the bubble-point pressure (a rare case), free gas will dissolve in the oil. Turbulence in the transition zone will produce the finely dispersed liquid-gas mixture which sufficiently decreases the negative influence of the gas on the pump. The down-side end of such a device may reach the filter zone in the bottom hole of the well.

The equipment used for rod pumps is similar to that in the form of inserts, but there is no need for centering and anchoring the devices. The equipment should have convenient joints with the rod on its upper and lower ends.

It will thus be seen that the invention could be used in free flowing oil wells in order to provide a number of advantages including maximum utilization of the dissolved gas energy, higher production rates with the same well head pressure, and/or prolongation of the free flowing period. The invention may also be utilized in gas/lift oil wells, to provide one or more of the foregoing advantages and, in addition, reduction of the starting pressure, reduction of the volume of the gas introduced from above ground, and higher production rates with lower gas consumption.

FIGS. 12 and 13 illustrate the invention implemented in a moving-plunger type of oil well (plunger lift), wherein the string of inserts, generally designated 80, is below the moving plunger 81 (in FIG. 12), or above the moving plunger 81 (in FIG. 13), or on both sides of the moving plunger. FIG. 14 illustrates another arrangement wherein the alternating zones are produced by the tubing e.g., as shown in FIGS. 2, 6, 7a, 7b, in which case special sliders 83 should be provided for the plunger to move.

In the case where the pump is a large pump, the device may become an integral part of the rod which is moving up and down. This movement will produce additional turbulence in the transition zone.

OTHER POSSIBLE APPLICATIONS OF THE INVENTION

The invention may advantageously be used also in mixing and/or conveying immiscible liquids, and in many other applications including the following:

Heavy Viscous Oil Transport

The invention could be used in the transport of viscous oils in production wells or in pipelines, either with the presence or the absence of gas in the flowing liquid. In the small-area zones, the higher velocity produces higher shear stresses in the liquid which reduce the viscosity and improve the hydrodynamic characteristics. The turbulence produced in the transitions zone tends to destroy the internal structure of the heavy oil; and the pressure fluctuations when the oil flows through the adjacent sections of the tubing produces viscosity reductions and liquid restructuring which further improve the hydrodynamic characteristics.

If a gas is present in the stream of the heavy viscous oil, all the above-described gas-related effects will be combined with the above-mentioned heavy oil effects to improve the flow characteristics.

Gas & Condensate Wells

Gas and condensate wells very often are mentioned together. A common characteristic for these types is that the entire stream is a gas stream rather than a liquid stream. In the case of condensate wells, the liquid condensate is also present in the well and has to be lifted above ground.

The main production problem of such wells is that when the production reservoir energy is depleted, the liquid phase (in the case of pure gas wells it is water that approaches and enters the well in comparatively low quantities) partially remains in the bottom-hole zone, and is partially drawn out of the well. After the liquid volume in the bottom-hole zone become higher than some critical value, the well stops producing, and it becomes necessary to remove the liquid from the bottom-hole of the well. Such wells are called water loading gas wells and condensate loading gas/condensate wells.

The method and device of the present invention are able to solve the problem described for a variety of such wells, according to the following mechanism:

(a) The velocity in the small cross-section area should be higher than the so-named critical velocity required for the liquids to be lifted.

(b) The mixing in the transition zone leads to the destruction of the large liquid droplets, and after a pass through a number of successive sections of the device, the flow tends to form a "mist flow" regime including small droplets of liquid uniformly distributed in the gas stream. The effect may be illustrated by FIGS. 4 and 5 where the liquid is the gas, and the gas is liquid droplets.

(c) The pressure fluctuations almost have no effect on this process.

Sand Producing Wells

This is stand-alone area of application. Very often sand particles are delivered from the production reservoir into the bottom hole zone of the oil/gas/condensate well. The problem is similar to the liquid loading gas wells, except that instead of the liquid, the sand is loaded in the bottom-hole zone of the well and causes the well to stop production.

The described method and device operates in a similar manner as in the case of gas wells, except the liquid droplets are replaced by sand particles. The only difference is that the sand particles are not reduced in size into smaller ones, but they are fine enough. Finally, the uniformly distributed liquid-sand mixture will flow through the well. This effect may be successfully combined with all the other effects described above that improve the hydrodynamic characteristics of the well or improve the liquid removal process.

Plunger-Lift

This production method involves introducing a moving plunger into the well. When there is enough energy for liquid to flow, the plunger cyclically moves up and delivers the liquid to the wellhead, after which it drops back to the downside end of the tubing. For this application, it is preferred to use one of the three variations illustrated in FIGS. 12, 13 and 14, namely:

1. to have the inserts attached as an integral part of the moving plunger on its down side end, (FIG. 12);
2. to have the inserts attached as an integral part of the moving plunger on its upper side end, (FIG. 13); or
3. to introduce the alternating zones as an integral part of the tubing (FIG. 14); in which case, the equipment should include specials sliders for the plunger to move as shown in FIGS. 14 and 15.

Oil Transport through the Pipelines

Here the problems are: (1) negative influence of the free gas in the pipeline; and (2) poor hydrodynamic characteristics. The novel method and apparatus solve both problems since (1) the finely dispersed liquid-gas mixture is produced to reduce the amount of free gas in the pipeline; and (2) the stream density is reduced to improve the hydrodynamic characteristics of the flow.

Wells Drilling

The invention is particularly useful in the well drilling process because of the: (1) improvement of the drilling fluid hydrodynamics: and (2) increase of the efficiency of the drilling fluid removal from the producing reservoir after the drilling is completed. Since the drilling fluid represents a heavy, highly viscous non-Newtonian liquid, the basic principals would be the same as in the case of the transport and production of heavy viscous oils.

Accordingly, while the invention has been described with respect to several preferred embodiments, it will be appreciated that these are set forth merely for purposes of example, and that many other variations, modifications and applications of the invention may be made.

What is claimed is:

1. A method of conveying a fluid flowing through a flow passageway in a tubing, comprising:

introducing into the flow passageway flow zones of small cross-sectional area alternating with flow zones of large cross-sectional area to produce high-velocity, low-pressure zones alternating with low-velocity, high-pressure zones; and providing abrupt transitions from the small cross-sectional area zones to the large cross-sectional area zones to produce a turbulent flow generating swirls and eddies at such transitions, wherein said fluid is a liquid-sand mixture, said high velocity flow produced in the small cross-sectional area zones being effective to carry out the sand with the liquid flow, and said turbulent flow produced at the abrupt transitions being effective to intensively mix sand particles within the liquid, and thereby to enhance the flow through the tubing.

2. A method of conveying a fluid flowing through a flow passageway in a tubing, comprising:

introducing into the flow passageway flow zones of small cross-sectional area alternating with flow zones of large cross-sectional area to produce high-velocity, low-pressure zones alternating with low-velocity, high-pressure zones; and providing abrupt transitions from the small cross-sectional area zones to the large cross-sectional area zones to produce a turbulent flow generating swirls and eddies at such transitions, wherein said fluid is a gas-liquid mixture comprising liquid droplets within a flowing gas, said high velocity flow produced in the small cross-sectional area zones being effective to carry out the liquid with the gas flow, and said turbulent flow at the abrupt transitions being effective to reduce the size of the liquid droplets and to uniformly distribute them within the gas flow.

3. A method of conveying a fluid flowing through a flow passageway in a tubing, comprising:

introducing into the flow passageway flow zones of small cross-sectional area alternating with flow zones of large cross-sectional area to produce high-velocity, low-pressure zones alternating with low-velocity, high-pressure zones thus generating pressure and velocity fluctuations; and providing abrupt transitions from the small cross-sectional area zones to the large cross-sectional area zones to produce a turbulent flow generating swirls and eddies at such transitions, wherein said fluid is a viscous liquid, said high velocity flow produced in the small cross-sectional area zones being effective to produce high shear stresses in the liquid, said turbulent flow in the abrupt transitions being effective to destroy the internal structure of the liquid, said pressure fluctuations produced in the liquid flowing through the alternating small cross-sectional area zones and large cross-sectional area zones being effective to produce viscosity reductions and liquid restructuring which further improve the hydrodynamic characteristics of said liquid.

4. A method of conveying a fluid flowing through a flow passageway in a tubing, comprising:

introducing into the flow passageway flow zones of small cross-sectional area alternating with flow zones of large cross-sectional area to produce high-velocity, low-pressure zones alternating with low-velocity, high-pressure zones; and providing abrupt transitions from the small cross-sectional area zones to the large cross-sectional area zones to produce a turbulent flow generating swirls and eddies at such transitions, wherein said flow passageway is in a horizontally-extending tubing of an oil pipeline.

5. An oil well for delivering oil from an underground reservoir to the surface, comprising:

upwardly-extending tubing defining a flow passageway for the oil;

said flow passageway including small cross-sectional area zones alternating with large cross-sectional area zones, and abrupt transitions from the small cross-sectional area zones to the large cross-sectional area zones, to produce a turbulent flow at said transitions generating swirls and eddies effective to produce small and uniform gas bubbles decreasing the density of a liquid-gas mixture and enhancing its flow through said passageway, wherein said small and large cross-sectional area zones are defined by sections of said tubing having shaped inner surfaces defining the small and large cross-sectional area zones, and wherein said tubing sections are threaded at their opposite ends for threadedly attaching them to the tubing.

* * * * *